United States Patent [19]

Weinkauf et al.

[11] Patent Number: 5,266,629
[45] Date of Patent: Nov. 30, 1993

[54] POLYKETONE CONTAINING GRAPHITE NUCLEATING AGENT

[75] Inventors: Donald H. Weinkauf, Houston; Ananda M. Chatterjee, Katy, both of Tex.

[73] Assignee: Shell Oil Company, Houston, Tex.

[21] Appl. No.: 979,681

[22] Filed: Nov. 20, 1992

[51] Int. Cl.$^5$ .............................................. C08L 87/00
[52] U.S. Cl. .................................. 524/612; 524/495; 524/847; 524/881
[58] Field of Search ................ 524/612, 847, 881, 495

[56] References Cited

U.S. PATENT DOCUMENTS 4,321,334  3/1982  Chatterjee ........................... 524/579
4,954,548  9/1990  Klingensmith ....................... 524/258
5,077,385  12/1991 Gerlowski et al. ................... 528/392

FOREIGN PATENT DOCUMENTS 2548371 10/1975 Fed. Rep. of Germany .
57027792 7/1980 Japan .
59184254 4/1983 Japan .

*Primary Examiner*—Harold D. Anderson
*Attorney, Agent, or Firm*—James O. Okorafor

[57] ABSTRACT

A crystallizable thermoplastic polymer composition is prepared by adding a small amount of a substantially graphitic non-turbostratic carbon to a polyketone polymer. The graphitic carbon acts as a nucleating agent, increasing the crystallization rate of polyketone polymer.

11 Claims, No Drawings

POLYKETONE CONTAINING GRAPHITE NUCLEATING AGENT

FIELD OF THE INVENTION

This invention relates to polyketone polymers. More particularly, this invention relates to polyketone polymer compositions containing a graphite nucleating agent.

BACKGROUND OF THE INVENTION

Polymers of carbon monoxide and olefins, generally referred to as polyketones, are well known in the art. The polyketone polymers of the subject invention are of a specific linear alternating type. Such polymers have utility as premium thermoplastics in the manufacture of a wide variety of shaped articles.

The addition to a polymer of a nucleating agent, to promote crystallization of the polymer from the melt, is also well known in the art. Nucleating agents allow faster processing of a polymer, and provide a more uniform microstructure because smaller spherulites form upon melt crystallization. Products molded from polymers containing a nucleating agent generally exhibit improved physical and mechanical properties.

The use of foreign materials as nucleating agents is highly selective, and there is no universally strong nucleating agent for all polymers. A nucleating agent effective for one polymer may be ineffective for even a closely related polymer. Similarly, a compound closely related to an effective nucleating agent for a given polymer, may be ineffective in that same polymer.

In general, the efficacy of a nucleating agent is indicated by an increase in the crystallization temperature for a polymer, preferably when the nucleating agent is present at a low level of addition. Higher crystallization temperatures are generally indicative of faster crystallization rates. For the production of molded articles, faster crystallization rates allow higher production rates.

It is an object of this invention to provide an effective nucleating agent for a polyketone polymer. In particular, it is an object of this invention to provide polyketone polymer compositions containing an effective amount of a graphitic nucleating agent.

SUMMARY OF THE INVENTION

The present invention provides a polymer composition of a linear alternating polyketone polymer and an effective amount of a graphite nucleating agent. The compositions demonstrate higher crystallization temperatures and faster crystallization rates, with little or no decline in mechanical properties. The compositions also exhibit improved water vapor barrier properties. The subject invention also includes articles manufactured from the compositions of the invention, and a method for increasing the crystallization rate of a polyketone polymer.

DESCRIPTION OF THE INVENTION

The polyketone polymers of the invention are thermoplastic polymers of a linear alternating structure and contain substantially one molecule of carbon monoxide for each molecule of ethylenically unsaturated hydrocarbon. Hereinafter, these polymers may be simply referred to as polyketones.

Ethylenically unsaturated hydrocarbons suitable for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene.

The preferred polyketone polymers are copolymers of carbon monoxide and ethylene or terpolymers of carbon monoxide, ethylene, and a second ethylenically unsaturated hydrocarbon of at least 3 carbon atoms, particularly an α-olefin such as propylene. When the preferred polyketone terpolymers are employed, there will be within the terpolymer at least about 2 units derived from a monomer of ethylene for each unit derived from a monomer of the second hydrocarbon. Preferably, there will be from about 10 units to about 100 units derived from a monomer of ethylene for each unit derived from a monomer of the second hydrocarbon.

The polymer chain of the preferred polyketone polymers has recurring units represented by the formula

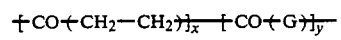

wherein G is derived from the monomer of ethylenically unsaturated hydrocarbon of at least 3 carbon atoms polymerized through the ethylenic unsaturation and the ratio of x:y is at least about 2:1. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(—CH$_2$—CH$_2$—)— units and the —CO—(—G—)— units are found randomly throughout the polymer chain, and preferred ratios of x:y are from about 10:1 to about 100:1. The end groups or "caps" of the polymer chain will depend upon what materials were present during the production of the polymer and whether or how the polymer was purified. The precise nature of the end groups does not appear to influence the properties of the polymer to any considerable extent, so the polymers are fairly represented by the formula for the polymer chain as depicted above.

The properties of the polyketone polymer are greatly influenced by the molecular purity of the polymer, as measured by the extent to which the polymer consists of repeating units of the above formula. A polymer of substantially lower carbon monoxide content cannot exhibit the linear alternating nature of the above formula. A polymer made by other methods, such as by free radical polymerization, will not typically have the regular, linear alternating structure of the polyketone polymers of the invention.

Of particular interest are the polyketone polymers of number average molecular weight from about 1,000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt, or nickel, the anion of a strong non-hydrohalogenic acid, and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The graphite nucleating agent of the invention is a substantially graphitic, non-turbostratic carbon.

Two of the allotropic, or isomeric forms of carbon are commonly known as graphite and carbon black (amorphous carbon). The graphite crystalline structure is formed from parallel layers of condensed planar six-member carbon rings. In a completely graphitic crystalline structure, the planar layers stack in three-dimensionally ordered parallel spacing, 0.33538 nm apart at room temperature. A range of intermediates lies between this pure graphite structure and the turbostratic structure characteristic of amorphous carbon. The inter-layer spacing, or d spacing, increases from the pure graphite value of 0.33538 nm to the turbostratic value of 0.344 nm as the degree of graphitization decreases. As the planar layers move further apart, they assume progressively more random, though parallel, positions with respect to each other, such that three-dimensional ordering is replaced by two-dimensional ordering.

The graphite nucleating agent of the invention is characterized as possessing a three-dimensional ordering of structure, and consequently, as non-turbostratic. The nucleating agent is further characterized as substantially graphitic, as defined by the inter-layer d spacing. The substantially graphitic nucleating agent has a d spacing of from 0.33538 nm (completely graphitic) to about 0.340 nm. This range is believed to correspond to a graphitization percentage of 100% to about 25%. Non-turbostratic carbon with a d spacing of from 0.33538 nm to about 0.339 nm is preferred, with 0.33538 nm to about 0.338 nm most preferred. The non-turbostratic carbon may be naturally occurring or synthetic.

In general, good dispersion within a polymer is required for the nucleating agent to be effective. Dispersion may be facilitated by using a nucleating agent with a small particle size. The graphite nucleating agent of the invention preferably has a particle size greater than about 0.1 µm. To facilitate good dispersion, a finely divided, or powdered graphite is preferred, for example, a graphite powder with a particle size distribution of 95% less than 55 µm and 50% less than 20 µm. The particle size distribution of the graphite may change as it is incorporated into the polyketone polymer, due to shear forces encountered in melt processing steps.

In general, the crystallization rate for a polymer rises and eventually tends to level off with increasing concentrations of nucleating agent. This levelling off occurs at lower concentrations with the more effective nucleating agents. In general, a more effective nucleating agent may be used in lower amounts to achieve a given nucleating effect for a given polymer.

Preferred amounts of the substantially graphitic non-turbostratic carbon nucleating agent will depend in part on its quality (degree of graphitization and purity) as balanced against cost. Additional considerations include the desired crystallization rate, structural heterogeneity in the polymer (introduced by addition of the nucleating agent), and mechanical properties of the finished composition.

The precise percentage of the graphite nucleating agent to be employed in the polyketone polymer compositions of the invention will depend upon the anticipated end use for the material. Compositions containing from about 0.01 wt % to about 0.5 wt %, based on total composition of the graphite are believed to be satisfactory, with 0.01 wt % to 0.2 wt % being preferred.

This invention is also directed to a method for increasing the crystallization rate of a polyketone composition which comprises adding, in the respective amounts described above, a substantially graphitic non-turbostratic carbon nucleating agent to the polyketone polymer. The method used to mix the components is not critical so long as the non-turbostratic carbon is well dispersed in the polymer. Conventional melt processing equipment can be used to combine the nucleating agent with the polymer.

The compositions of the invention may also include other additives such as antioxidants and stabilizers, fillers and reinforcements, mold release agents, fire retarding chemicals, colorants, and other materials which are designed to improve the processability of the polymer or the properties of the resulting blend. Such additives are added to the polymer concurrently with, prior to, or subsequent to, the graphite nucleating agent.

The invention is further illustrated by the following Examples which should not be regarded as limiting.

EXAMPLE 1

A linear alternating copolymer of carbon monoxide and ethylene (91136/37) was produced in the presence of a catalyst composition formed from palladium acetate, trifluoroacetic acid and 1,3-bis[di(2-methoxyphenyl)phosphino]propane. The polyketone polymer had a melting point of about 250° C. and an LVN of about 1.95 dl/g when measured in m-cresol at 60° C. The polyketone polymer also contained conventional additives.

EXAMPLE 2

The polyketone copolymer of Example 1 was blended with a finely ground graphite powder (particle size distribution of 95% less than 55 µm and 50% less than 20 µm) with an interlayer spacing of about 0.3372 nm. Samples containing various concentrations of graphite were prepared, as shown in Table 1.

Graphite powder at the 0.5 wt % and 1.0 wt % loadings was tumbled into the polymer. After drying for 48 hours at 65° C., the blends were compounded at a melt temperature of about 290° C. using a 30 mm Haake extruder with an intensive mixing screw configuration. Other polymer compounds with lower weight fractions of graphite powder were prepared by simply dry blending the 1.0 wt % blend pellets with neat polymer pellets in the subsequent melt processing steps.

Samples for DSC testing were prepared by compression molding polymer pellets into 30 mil plaques. Crystallization temperatures were measured using differential scanning calorimetry (DSC). The tests were run in a Perkin-Elmer DSC-7, which employs sealed pan containers. The samples were first held at 50° C. above the melting point for two minutes and subsequently cooled at 20° C./min. The crystallization temperature was reported as the peak of the crystallization exotherm during the cooling cycle. Results are shown in Table 1.

TABLE 1

| Graphite (wt %) | Crystallization Temperature (°C.) |
| --- | --- |
| 0 | 200.3 |
| 0.05 | 207.4 |
| 0.1 | 207.4 |
| 0.2 | 208.9 |
| 0.5 | 209.5 |
| 1.0 | 209.3 |

The good nucleating efficiency of the graphite is demonstrated by the seven to nine degree increase in crystallization temperature, maintained even at the lowest graphite loading (0.05 wt %). Typically, commercial nucleating agents are used at levels of 0.03 to 0.3 wt %. The efficiency of nucleation at low loadings suggests that graphite functions as an effective nucleating agent for the polyketone polymer.

Crystallization kinetics were also determined through use of DSC techniques. Polymer samples were held at 300° C. for two minutes to ensure complete melting, then rapidly cooled to the desired crystallization temperature. Crystallization exotherms were measured as a function of time. The equilibrium level of crystallization for the polyketone polymer at any crystallization temperature is less than 100%. The isothermal crystallization half-time was defined as the time at which 50% of the equilibrium level of crystallization was achieved. Thus the crystallization half-time is a direct measure of the rate of crystallization in the polymer, where shorter crystallization half-times imply faster crystallization rates. Results for various crystallization temperatures are shown in Table 2.

TABLE 2

| Crystallization Temperature (°C.) | Crystallization Half-Time (min) | |
| --- | --- | --- |
| | Polyketone (Control) | Polyketone w/ 0.5 wt % Graphite |
| 215.0 | 0.37 | — |
| 217.5 | 1.25 | — |
| 220.0 | 4.50 | 0.82 |
| 222.5 | 9.37 | 1.14 |
| 225.0 | — | 4.26 |
| 227.5 | — | 8.33 |

It is evident from the data in Table 2 that a graphite nucleating agent has a dramatic effect on the crystallization rate for the polyketone polymer. Crystallization half-times for the samples containing a graphite nucleating agent were reduced by a factor of five to eight, relative to those for the respective control samples. These results demonstrate that a graphite nucleating agent may be used to increase the crystallization rate of a polyketone polymer.

Specimens for mechanical property testing were prepared by injection molding standard test specimens using a 250 ton Engel injection molding machine. Molded specimens were stored over desiccant until tested. Mechanical testing was performed on dry as molded samples. Tensile modulus, yield stress, elongation at yield, and notched Izod impact (at −30° C.) for the various samples are shown in Table 3.

TABLE 3

| Graphite (wt %) | Tensile Modulus (psi) | Yield Stress (psi) | Elongation @ Yield (%) | −30C Izod Impact (ft-lbs/in) |
| --- | --- | --- | --- | --- |
| 0 | 193,800 | 12,480 | 61 | 1.39 |
| 0.05 | 201,700 | 12,470 | 61 | 1.23 |
| 0.1 | 204,300 | 12,580 | 60 | 1.18 |
| 0.2 | 204,900 | 12,560 | 60 | 1.24 |
| 0.5 | 214,200 | 12,790 | 60 | 1.33 |
| 1.0 | 215,500 | 12,880 | 59 | 1.40 |

The addition of a graphite nucleating agent resulted in a four to eleven percent increase in tensile modulus. Yield stress, elongation at yield, and Izod impact strength were maintained throughout the range of graphite addition. The samples exhibit a suitable balance of properties at graphite loading levels commonly used for nucleating agents.

EXAMPLE 3

A linear alternating terpolymer of carbon monoxide, ethylene, and propylene (90/067) was produced in the presence of a catalyst composition formed from palladium acetate, trifluoroacetic acid and 1,3-bis[di(2-methoxyphenyl)phosphino]propane. The polyketone polymer had a melting point of about 221° C. and an LVN of about 1.05 dl/g when measured in m-cresol at 60° C. The polyketone polymer also contained conventional additives.

EXAMPLE 4

The polyketone terpolymer of Example 3 was blended with a finely ground graphite powder (particle size distribution of 95% less than 55 μm and 50% less than 20 μm) with an interlayer spacing of about 0.3372 nm. Samples containing 0.5 wt % and 1.0 wt % graphite were prepared by the methods described in Example 2, using a melt temperature of about 240° C.

Crystallization temperatures and crystallization rates were measured using the DSC techniques described in Example 2. Results are shown in Table 4. The good nucleating efficiency of the graphite was demonstrated by the ten degree increase in crystallization temperature.

TABLE 4

| Graphite (wt %) | Crystallization Temperature (°C.) |
| --- | --- |
| 0 | 174.0 |
| 0.5 | 184.0 |
| 1.0 | 185.0 |

Crystallization kinetics were determined by the method described in Example 2, with the exception that polymer samples were held at 275° C. for two minutes to ensure complete melting. Results for various crystallization temperatures are shown in Table 5.

TABLE 6

| Crystallization Temperature (°C.) | Crystallization Half-Time (min) | |
|---|---|---|
| | Polyketone (Control) | Polyketone w/ 0.5 wt % Graphite |
| 190 | 1.00 | 0.14 |
| 195 | 2.91 | 0.39 |
| 198 | — | 1.18 |
| 200 | 12.41 | 2.12 |

It is evident from the data in Table 5 that a graphite nucleating agent has a dramatic effect on the crystallization rate for the polyketone polymer. Crystallization half-times for the samples containing a graphite nucleating agent were reduced by a factor of five to eight, relative to those for the respective control samples. These results demonstrate that a graphite nucleating agent may be used to increase the crystallization rate of a polyketone polymer.

Specimens for mechanical property testing were prepared by the same methods utilized in Example 2. Tensile modulus, yield stress, elongation at yield, and notched Izod impact (at −30° C.) for the various samples are shown in Table 6.

TABLE 6

| Graphite (wt %) | Tensile Modulus (psi) | Yield Stress (psi) | Elongation @ Yield (%) | −30C Izod Impact (ft-lbs/in) |
|---|---|---|---|---|
| 0 | 147,600 | 9,587 | 29 | 0.81 |
| 0.5 | 151,900 | 9,910 | 27 | 0.76 |
| 1.0 | 156,000 | 9,966 | 27 | 0.75 |

The addition of a graphite nucleating agent resulted in a three to six percent increase in tensile modulus and yield stress. Elongation at yield and Izod impact strength were essentially unchanged by graphite addition. The samples exhibit a suitable balance of properties even at graphite loading levels above those commonly used for nucleating agents.

EXAMPLE 5

A linear alternating terpolymer of carbon monoxide, ethylene, and propylene (91/054) was produced in the presence of a catalyst composition formed from palladium acetate, trifluoroacetic acid and 1,3-bis[di(2-methoxyphenyl)phosphino]propane. The polyketone polymer had a melting point of about 227° C. and an LVN of about 1.66 dl/g when measured in m-cresol at 60° C. The polyketone polymer also contained conventional additives.

EXAMPLE 6

For comparison, the polyketone polymer of Example 5 was blended with a graphite nucleating agent (of the invention), and a variety of commercially available nucleating agents (not of the invention), all at 1 wt % loading. The graphite nucleating agent was a finely ground graphite powder (95% less than 55 μm and 50% less than 20 μm) with an interlayer spacing of about 0.3372 nm. The comparative nucleating agents are used commercially in polyolefins.

The polymer powder of Example 5 was dried for 48 hrs under vacuum with a slight N$_2$ purge at 65° C. The nucleating agents were dry tumbled with the polyketone polymer at 1 wt % just prior to compounding. The materials were compounded in a 15 mm Baker-Perkins extruder with an intensive mixing screw configuration. After a second drying procedure, the pellets were compression molded into 30 mil plaques for analysis by DSC.

The DSC protocol was to hold the polyketone polymer in the melt state for two minutes at 275° C. and then cool at 50° C./min to observe the crystallization temperature. The crystallization temperature was reported as the maximum in the crystallization exotherm on cooling. A second series of experiments was also conducted using a melt temperature of 300° C. The results of the DSC testing are shown in Table 7.

TABLE 7

| Nucleating Agent (1 wt %) | Crystallization Temperature[1] (°C.) | Crystallization Temperature[1] (°C.) |
|---|---|---|
| None | 181 | 166 |
| Graphite | 190 | 175 |
| Sodium bis(para-t-butylphenyl)phosphate | 177 | 152 |
| Bis(p-methylbenzylidene)sorbital | 182 | 167 |
| 1,2 dihydroxyanthraquinone | 179 | 152 |
| sodium benzoate | (very poor melt appearance) | |
| ICI PA-80050 | 181 | 149 |

[1]Materials held at 275° C. for two minutes.
[2]Materials held at 300° C. for two minutes.

The series of samples held at 300° C. exhibited somewhat lower crystallization temperatures as might be expected from thermal degradation. In each case, however, the only material to provide any significant increase in the crystallization temperature over the control is the graphite nucleating agent. With the addition of graphite, the crystallization temperature of polyketone polymer increased by 9° C.

The comparative nucleating agents, all commercially used, provided little or no increase in crystallization temperature for the polyketone polymer. It is apparent that other nucleating agents are not effective in the polyketone polymer. From the low crystallization temperatures of the comparative nucleating agents, the comparative systems may in fact be prodegradants.

EXAMPLE 7

The polyketone polymer of Example 3, and a blended sample of the polyketone and 0.5 wt % graphite, prepared as described in Example 2, were injection molded into 7.5 oz. cups using a 250 ton Engel injection molding machine. The cups had an average wall thickness of about 27 mils.

The cups were filled with water, double seamed with an aluminum lid, maintained in a 50% relative humidity environment, and weighed periodically to determine water loss over time. Some of the samples were also subjected to a retort cycle in a Barnstead benchtop sterilization unit with 15 psi overpressure. The retort temperature was increased until the internal temperature reached 120° C., at which point the container was slowly cooled to ambient temperature. The total cycle required about three hours. The water vapor transmission rates for these containers are shown in Table 8. The addition of graphite reduced the water vapor transmission rate of the polyketone polymer by about 15%, both before and after retort.

TABLE 8

| Graphite (wt %) | Water Vapor Transmission Rate (g/mil/100 in$^2$/day) | |
|---|---|---|
| | Before Retort | After Retort |
| 0 | 4.0 | 6.2 |

TABLE 8-continued

| Graphite | Water Vapor Transmission Rate (g/mil/100 in²/day) | |
|---|---|---|
| (wt %) | Before Retort | After Retort |
| 0.5 | 3.5 | 5.3 |

Other embodiments if the invention will be apparent to those skilled in the art from a consideration of this specification, or by practice of the invention described herein. It is intended that the specification and examples be considered as exemplary only, with the true scope and spirit of the invention being indicated by the following claims.

What is claimed is:

1. A method of increasing the crystallization rate of a polyketone polymer by adding to the polyketone polymer from about 0.01 wt % to about 0.5 wt %, based on total polymer composition, of a graphite nucleating agent.

2. A method as in claim 1 wherein the graphite nucleating agent is present at from about 0.01 wt % to about 0.2 wt %, based on total polymer composition.

3. A method as in claim 2 wherein the graphite nucleating agent is a substantially graphitic, non-turbostratic carbon.

4. A method as in claim 2 wherein the graphite nucleating agent has an inter-layer spacing of from 0.33538 nm to about 0.340 nm.

5. A polymer composition consisting essentially of:
a linear alternating polyketone polymer, wherein the polyketone polymer has recurring units represented by the formula $$+CO+CH_2-CH_2+_x+CO+G+_y-$$

wherein G is derived from a monomer of an α-olefin of at least 3 carbon atoms polymerized through the ethylenic unsaturation and the ratio of x:y is at least about 2:1, and from about 0.01 wt % to about 0.5 wt %, based on total polymer composition, of a graphite nucleating agent.

6. The composition of claim 5 wherein the graphite nucleating agent is present at from about 0.01 wt % to about 0.2 wt %, based on total polymer composition.

7. The composition of claim 6 wherein the ratio of y:x is from about 0.01 to about 0.1, and G is a moiety of propylene.

8. The composition of claim 7 wherein the graphite nucleating agent is a substantially graphitic, non-turbostratic carbon.

9. The composition of claim 6 wherein the y is 0.

10. The composition of claim 9 wherein the graphite nucleating agent is a substantially graphitic, non-turbostratic carbon.

11. An article manufactured from the composition of claim 5.

* * * * *